(12) United States Patent  (10) Patent No.: US 7,981,548 B2
Mimura  (45) Date of Patent: Jul. 19, 2011

(54) MULTILAYER SECONDARY BATTERY AND METHOD OF MAKING SAME

(75) Inventor: Kazuya Mimura, Kami-niikawa-gun (JP)

(73) Assignee: NEC Energy Devices, Ltd., Sagamihara-shi (JP)

( * ) Notice: Subject to any disclaimer, the term of this patent is extended or adjusted under 35 U.S.C. 154(b) by 1213 days.

(21) Appl. No.: 11/339,618

(22) Filed: Jan. 26, 2006

(65) Prior Publication Data

US 2006/0172185 A1    Aug. 3, 2006

(30) Foreign Application Priority Data

Jan. 28, 2005    (JP) .................. 2005-021458

(51) Int. Cl.
  *H01M 4/64*    (2006.01)
  *H01M 2/20*    (2006.01)
(52) U.S. Cl. ...................... 429/233; 429/129
(58) Field of Classification Search .......... None
  See application file for complete search history.

(56) References Cited

U.S. PATENT DOCUMENTS 6,387,564 B1 *  5/2002  Yamashita et al. ............ 429/132
6,692,866 B2 *  2/2004  Watanabe et al. ............ 429/129
2003/0049881 A1 *  3/2003  Takada et al. .................... 438/62
2003/0224242 A1 *  12/2003  Kaito et al. ...................... 429/94
2008/0050295 A1 *  2/2008  Uchida et al. ............... 423/179.5

FOREIGN PATENT DOCUMENTS

JP    2000-285955    10/2000
JP    2002-252023    9/2002
JP    2004-349156 A  12/2004

OTHER PUBLICATIONS

Japanese Office Action dated Apr. 1, 2011, issued in corresponding Japanese Patent Application No. 2006-018746.

* cited by examiner

*Primary Examiner* — Dah-Wei D Yuan
*Assistant Examiner* — Kwang Han
(74) *Attorney, Agent, or Firm* — Westerman, Hattori, Daniels & Adrian, LLP

(57) ABSTRACT

A multilayer secondary battery including a positive electrode having an active substance layer formed on a flat sheet-form collector and a negative electrode having an active substance layer formed on a flat sheet-form collector stacked together in opposite relation via a separator. The positive electrode active substance layer differs in area from the negative electrode active substance layer. Active substance-free portions with no active substance layer coated thereon are formed on sides of the outer periphery of a collector of the electrode having the smaller active substance layer. The surface of the collectors at the active substance-free portions is covered with an insulating layer. The end face of the insulating layer facing away from a side contiguous to an active substance layer and the end face of the electrode having a larger active substance layer area are stacked together on the same plane that intersects vertically an electrode plane.

9 Claims, 7 Drawing Sheets

MULTILAYER SECONDARY BATTERY AND METHOD OF MAKING SAME

CROSS-REFERENCE TO RELATED APPLICATIONS

This application is based upon and claims the benefit of priority from prior Japanese Patent Application No. 2005-21458, filed on Jan. 28, 2005, the entire contents of which are incorporated herein by reference.

BACKGROUND

1. Technical Field

The present invention relates generally to a multilayer secondary battery with a plurality of flat-form electrodes stacked together via a separator, and more particularly to a multilayer secondary battery wherein a positive electrode and a negative electrode differing in electrode area are stacked together via a separator and a method of making the same.

The invention is also concerned with a lithium ion secondary battery with a positive electrode smaller in size than a negative electrode and a method of making the same.

2. Related Art

Lithium ion batteries known until now are broken down into a wound-up type battery comprising an outer container containing a wound-up battery element with a positive electrode and a negative electrode, each in belt form, stacked together via a separator, and a multilayer secondary battery wherein an outer container contains a battery element comprising a positive electrode and a negative electrode, each in flat sheet form, stacked together via a separator.

FIG. 6 is a sectional view of a battery element in a prior art multilayer secondary battery, as sectioned in a vertical direction to an electrode plane.

A multilayer body of a battery element shown generally at 5 that forms part of a multilayer secondary battery comprises a positive electrode 2 and a negative electrode 3, each in flat sheet form, stacked together via a separator 4. The flat sheet-form positive electrode 2 has a positive electrode active substance layer 2B formed on a positive electrode collector 2A, a part of which extends outwardly from its portion facing the opposite electrode in the form of a positive electrode lead terminal 7. Likewise, the negative electrode 3 has a negative electrode active substance layer 3B on a negative electrode collector 3A, a part of which extends outwardly from its portion facing the opposite electrode in the form of a negative electrode lead terminal 8.

When, in manufacturing an electrode element by stacking the positive electrode and the negative electrode together via the separator, the multilayer electrode element is contained in an outer container such as a metal can or sealed up with an outer casing member having flexibility, it is found that there is a misalignment because the flat sheet-form positive electrode 2, the flat sheet-form negative electrode 3 and the separator 4 are each of independent structure, offering problems that internal short circuits occur upon partial direct contact of the positive electrode 2 with the negative electrode 3, or a misalignment between the positive electrode 2 and the negative electrode 3 fails to give any desired properties in terms of the charge/discharge capacity, etc. of the battery.

As the size of the separator is increased to get around internal short circuits even upon some electrode misalignment, the size of the outer container grows large, resulting in problems that battery products grow bulky, and the volume capacity density of the battery decreases.

For a secondary battery, it is required that the positive electrode and the negative electrode be located in such a way as to conduct uniform charge/discharge currents through any electrode plane site. Especially because currents are likely to concentrate at the corners of electrode ends, it is demanded to avert such concentration of currents at the electrode ends.

Especially when it comes to a lithium ion battery, concentration of currents at the corners of a negative electrode end during overcharging or the like causes dendrite to be formed, breaking through the separator and bringing about internal short circuits between the negative electrode and the positive electrode, or posing other problems.

For the lithium ion battery, therefore, the area of the negative electrode is designed to be larger than that of the opposing positive electrode for the purpose of preventing concentration of currents at the end of the negative electrode during charging.

FIGS. 7A, 7B and 7C are illustrative in plan of the sizes of the positive electrode, the negative electrode and the separator, respectively.

Among the length 81 and width 82 of a positive electrode 52 depicted in FIG. 7A, the length 83 and width 84 of a negative electrode depicted in FIG. 7B and the length 85 and width 86 of a separator depicted in FIG. 7C, there are relations given by positive electrode length 81<negative electrode length 83≦separator length 85 positive electrode width 82<negative electrode width 84≦separator width 86

Accordingly, difficulty would be encountered in stacking the components without any lateral misalignment even on the basis of any component.

To prevent any electrode misalignment during stacking with this in mind, JP-A-2002-252023 proposes a multilayer secondary battery wherein an electrode having a smaller area is covered on both sides with a separator and the outer peripheral size of the separator is the same as the size of an electrode having a larger area.

However, when the periphery of the separator is thermally fused while the electrode of smaller area is covered on both surfaces with the separator, it is not easy to do this in such a way as to have the positive electrode fixed inside with no wasteful space in the separator. It is also difficult to make the thermally fused width small enough to have no influence on battery performance.

SUMMARY

A primary object of the invention is to provide a lithium ion secondary battery which, even when positive and negative electrodes differing in electrode area are stacked together as is the case with an existing lithium ion battery wherein a multilayer structure comprising flat sheet-form positive and negative electrodes, each having an active substance layer formed on a collector comprising a metal foil or the like, are stacked together via a separator, is sealed up with an outer casing member, undergoes no lateral misalignment of the components, ensuring high production yields and high reliability, and a method of making the same.

The invention provides a multilayer secondary battery in which a positive electrode having a positive electrode active substance layer formed on a flat sheet-form collector and a negative electrode having a negative electrode active substance layer formed on a flat sheet-form collector are stacked together in opposite relation via a separator, wherein:

the positive electrode active substance layer differs in area from the negative electrode active substance layer, active substance-free portions with no active substance layer coated on them are formed on at least adjoining two sides of an outer periphery of a collector of a smaller area electrode having a smaller active substance layer area, a surface of the collector at the active substance-free portions is covered with an insulating substance layer, and an end face of the insulating substance layer that faces away from a side contiguous to an active substance layer and an end face of a larger area electrode having a larger active substance layer area are located and stacked together on the same plane that intersects vertically an electrode plane.

In one embodiment of the invention, the end face of the insulating substance layer that faces away from a side contiguous to an active substance layer and the end face of a larger area electrode having a larger active substance layer area are located and stacked together on a plane flush with the end face of the separator.

In another embodiment of the invention, the sides with the active substance-free portions formed thereon are opposite to a side from which an electrode lead terminal extends.

In another embodiment of the invention, the insulating substance layer is an adhesive or an adhesive double-coated tape.

In another embodiment of the invention, the positive electrode active substance-free portion to be formed on the positive electrode collector of the positive electrode is provided with a width of 2 mm to 5 mm from the outer periphery of the positive electrode collector.

In yet another embodiment of the invention, the multilayer secondary battery is in the form of a lithium ion battery wherein the smaller area electrode is a positive electrode and the larger area electrode is a negative electrode.

The invention also provides a method of making a multilayer secondary battery in which a positive electrode having a positive electrode active substance layer formed on a flat sheet-form collector and a negative electrode having a negative electrode active substance layer formed on a flat sheet-form collector are stacked together in opposite relation via a separator, characterized in that:

the positive electrode active substance layer differs in area from the negative electrode active substance layer, active substance-free portions with no active substance layer coated on them are formed on at least adjoining two sides of an outer periphery of a collector of a smaller area electrode having a smaller active substance layer area, a surface of the collectors at the active substance-free portions is covered with an insulating substance layer, and an end face of the insulating substance layer that faces away from a side contiguous to an active substance layer and an end face of a larger area electrode having a larger active substance layer area are located and stacked together on the same plane that intersects vertically an electrode plane, and covered up with a battery outer casing or received in a battery outer container, which is sealed up.

In one embodiment of the invention, the end face of the insulating substance layer that faces away from a side contiguous to an active substance layer, the end face of a larger area electrode having a larger active substance layer area and an end face of the separator are located and stacked together on the same plane, and covered up with a battery outer casing or received in a battery outer container, which is sealed up.

In another embodiment of the invention, stacking is carried out after the surface of the collector at the active surface-free portions is covered with an insulating substance and the separator is then located and fixed by an insulating substance layer.

In yet another embodiment of the invention, the insulating substance layer is either an adhesive or an adhesive double-coated tape.

BRIEF DESCRIPTION OF THE DRAWINGS

The invention will be described with reference to the accompanying drawings, wherein like numbers reference like elements.

DESCRIPTION OF EXEMPLARY EMBODIMENT

According to the invention, it is possible to obtain a multilayer secondary battery of high reliability which, like an existing lithium ion battery, is free from any mutual electrode misalignment even upon stacking of positive and negative electrodes differing in the areas of positive and negative electrode active substance layers, and free from any short circuit between the positive electrode and the negative electrode as well.

The multilayer secondary battery of the invention is now explained with reference to the drawings.

Figure 1A:
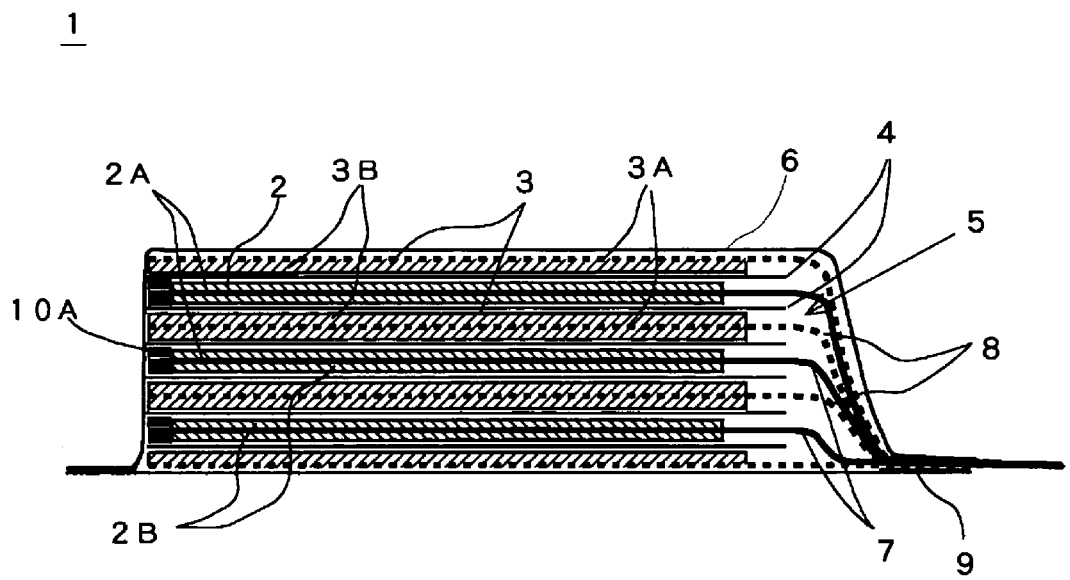
FIG. 1A is illustrative in section of the multilayer secondary battery according to the invention.

FIG. 1A is illustrative in section of the multilayer secondary battery according to the invention.

Figure 1B:
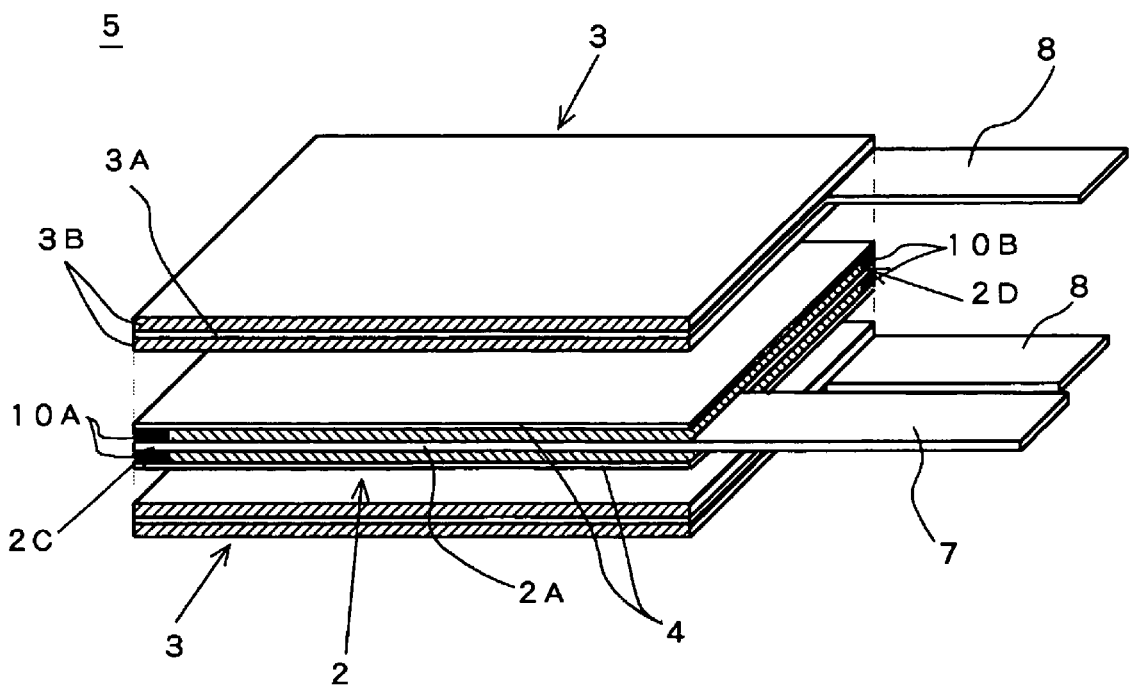
FIG. 1B is illustrative in perspective of how a part of the multilayer secondary battery according to the invention is stacked.

FIG. 1B is illustrative in perspective of a battery element in which some electrodes in the multilayer secondary battery according to the invention are stacked together.

A multilayer secondary battery 1 comprises an electrode element 5 sealed up with an outer casing member 6, in which element a plurality of flat sheet-form positive electrodes 2 and a plurality of flat sheet-form negative electrode 3 are stacked together via separators 4. Positive electrode lead terminals 7 and negative electrode lead terminals 8 are led out through a sealing port 9.

The flat sheet-form positive electrode 2 has a positive electrode active substance layer 2B formed on the surface of a flat sheet-form positive electrode collector 2A, and the flat sheet-form negative electrode 3 has a negative electrode active substance layer 3B formed on the surface of a flat sheet-form negative electrode collector 3A.

The flat sheet-form positive electrode 2 is smaller in area than the flat sheet-form negative electrode 3, and the flat sheet-form positive electrode collector 2A is provided on the outer peripheries of adjoining two sides with active substance-free portions 2C and 2D with no active substance coated thereon. The active substance-free portions 2C and 2D are covered with insulating substance layers 10A and 10B.

And then, the electrode element 5 is sealed up with the outer casing member 6 after the end faces of the insulating substance layers 10A and 10B on the active substance-free portions at the adjoining two sides, which face away from the sides in contact with the respective active substance layers, and the end faces of the separator 4 and the negative electrode 3 are located and stacked together on the same plane.

In the present disclosure, the area of the positive electrode means the area of the surface of the positive electrode layer formed on the positive electrode collector, which surface is parallel with the sheet-form positive electrode collector, and the area of the negative electrode means the area of the surface of the negative electrode layer formed on the negative electrode collector, which surface is parallel with the sheet-form collector.

Figure 2A:
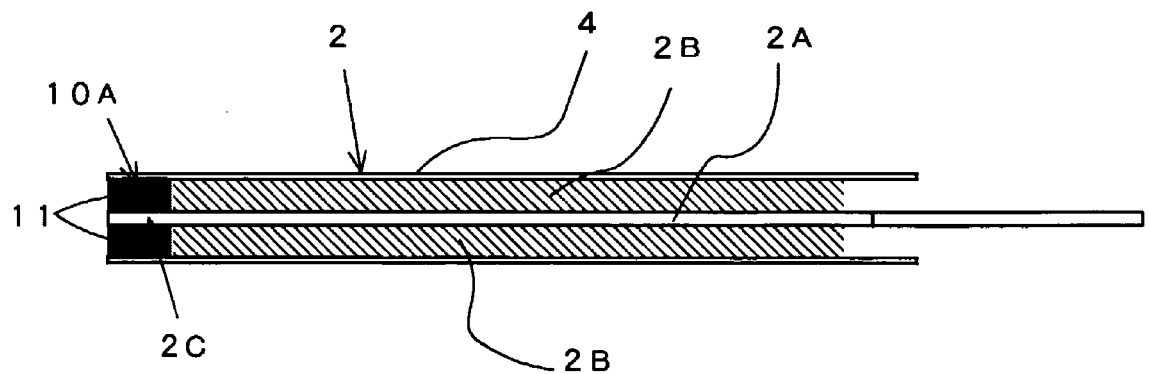
FIG. 2A is illustrative in section of the positive electrode in one embodiment of the invention.
Figure 2B:
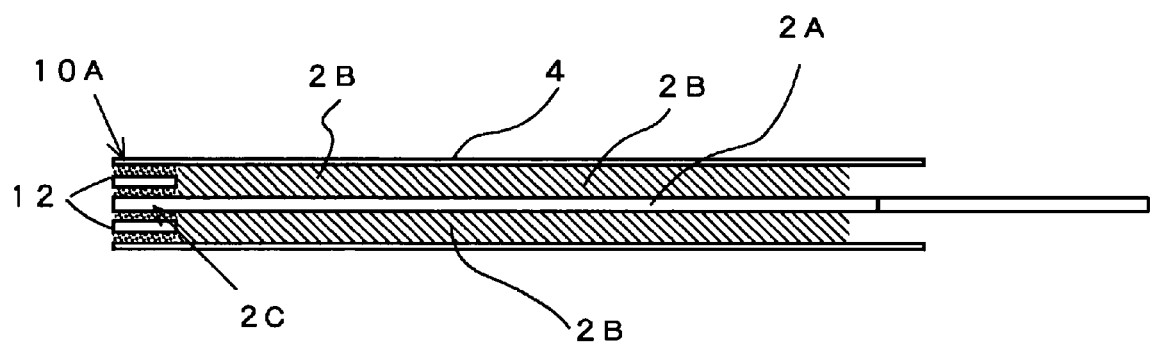
FIG. 2B is illustrative in section of the positive electrode in another embodiment of the invention.
Figure 2C:
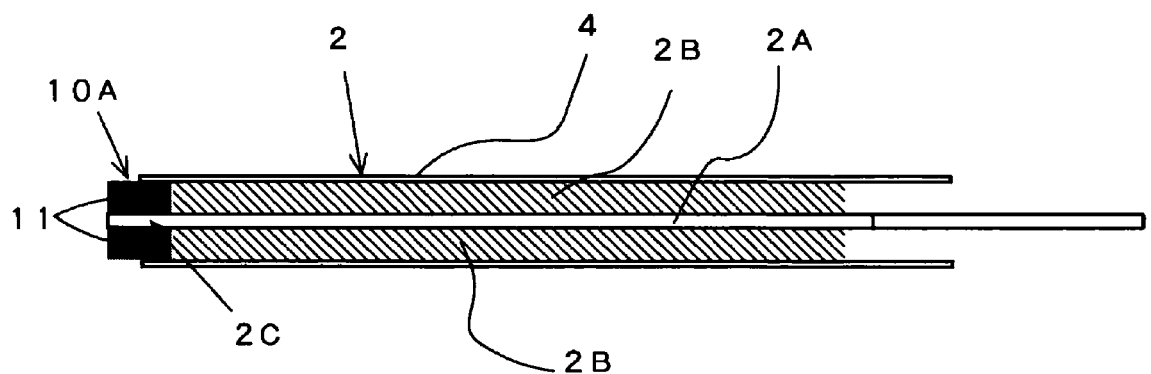
FIG. 2C is illustrative in section of the positive electrode in yet another embodiment of the invention.

FIG. 2A is illustrative in section of the positive electrode in one embodiment of the invention, and FIGS. 2B and 2C are illustrative in section of the positive electrode in another embodiment of the invention.

In a positive electrode 2 of FIG. 2A, a positive electrode collector 2A is provided on its outer periphery with an active surface-free portion 2C with no electrode active substance layer applied thereon. An adhesive 11 is used to form an insulating substance layer 10A on the active substance-free portion 2C.

The adhesive 11 also adheres to the separator 4 to fix it in place, and the end face of the insulating substance layer 10A comprising the adhesive applied on the active substance-free portion of the outer periphery of the collector of the positive electrode 2, the end face of the positive electrode collector 2A and the end face of the separator are all positioned on the same plane vertical to the surface of the positive electrode collector.

In the positive electrode 2A depicted in FIG. 2A, the separator 4 is bonded and fixed by the insulating substance layer comprising the adhesive to the positive electrode collector. Therefore, when the positive electrodes and the negative electrodes are stacked and assembled together into an electrode element, the end face of the insulating substance layer applied on the positive electrodes and the end faces of the negative electrodes can be positioned and stacked together on the same plane into a multilayer secondary battery with no misalignment.

In a positive electrode of FIG. 2B, an adhesive double-coated tape 12 is joined to an active substance-free portion 2C as an insulating substance layer 10A. More specifically, one surface of the adhesive double-coated tape 12 is joined to the active substance-free portion, and the other surface is joined to a separator 4 to fix it in place.

And then, the end face of the double-coated tape 12 joined to the active substance-free portion of the outer periphery of the collector, the end face of the positive electrode collector and the end face of the separator are all positioned on the same plane vertical to the surface of the positive electrode collector.

In the embodiments explained with reference to FIGS. 2A and 2B, each separator extends as far as the end face of the insulating substance layer formed on the active substance-free portion. However, it is understood that, as shown in FIG. 2C, the separator could be terminated short of the end face of the insulating substance layer. Alternatively, another member independent from the separator could be located on the surface of the insulating substance layer.

Figure 3A:
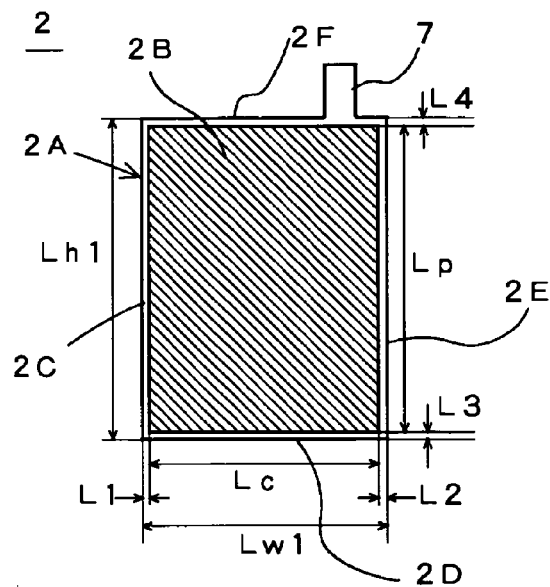
FIG. 3A is illustrative in plan of the positive electrode in one embodiment of the invention.
Figure 3B:
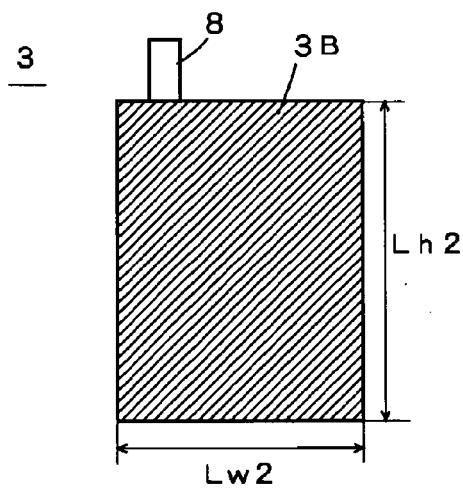
FIG. 3B is illustrative of the negative electrode in one embodiment of the invention.
Figure 3C:
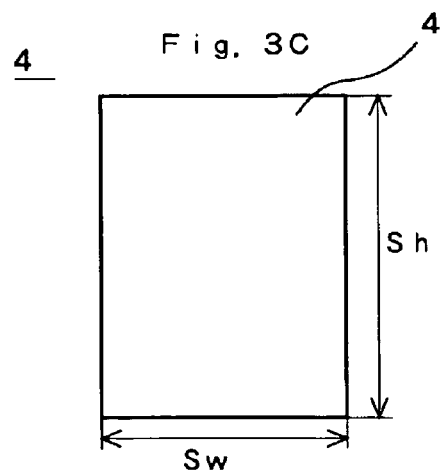
FIG. 3C is illustrative of the separator in one embodiment of the invention.

FIG. 3A is illustrative in plan of the positive electrode in one embodiment of the invention, FIG. 3B is illustrative of the negative electrode in one embodiment of the invention, and FIG. 3C is illustrative of the separator in one embodiment of the invention.

As depicted in FIG. 3A, a flat sheet-form positive electrode 2 has a positive electrode lead terminal 7, a positive electrode active substance layer 2B is formed on the surface of a flat sheet-form positive electrode collector 2A, and the positive electrode collector 2A is provided around it with positive electrode active substance-free portions 2C, 2D, 2E and 2F where no positive electrode active substance layer is formed.

As depicted in FIG. 3B, a flat sheet-form negative electrode 3 has a negative electrode lead terminal 8, and a negative electrode active substance layer 3B formed on it.

In FIGS. 3A and 3B, let Lh1 be the height of the positive electrode collector exclusive of the positive electrode lead terminal of the positive electrode, Lw1 be the width of the positive electrode collector, Lc be the width of the active substance layer on the positive electrode, Lp be the height of the active substance layer on the positive electrode, L1 and L2 be the widths of the positive electrode active substance-free portions 2C and 2E, respectively, L3 be the width of the positive electrode active substance-free portion 2D, L4 be the width of the positive electrode active substance-free portion 2F exclusive of the upper electrode lead terminal of the positive electrode collector, Lh2 be the height of the negative electrode, and Lw2 be the width of the negative electrode.

Among these, there are the following relations:

$Lh1=Lh2$ $Lw1=Lw2$ $Lw1=Lc+L1+L2$ $Lh1=Lp+L3+L4=Lh2$

Furthermore, let Sw be the width of the separator and Sh be the height of the separator. Then, the following relations hold.

$Sw=Lw1=Lw2$ $Sh=Lh1=Lh2$

Figure 4A:
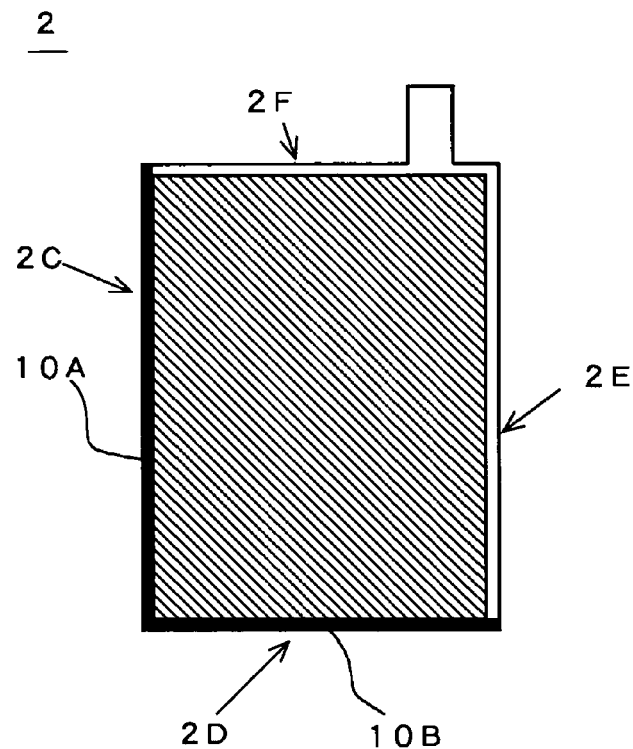
FIG. 4A is illustrative in plan of the positive electrode in one embodiment of the invention.
Figure 4B:
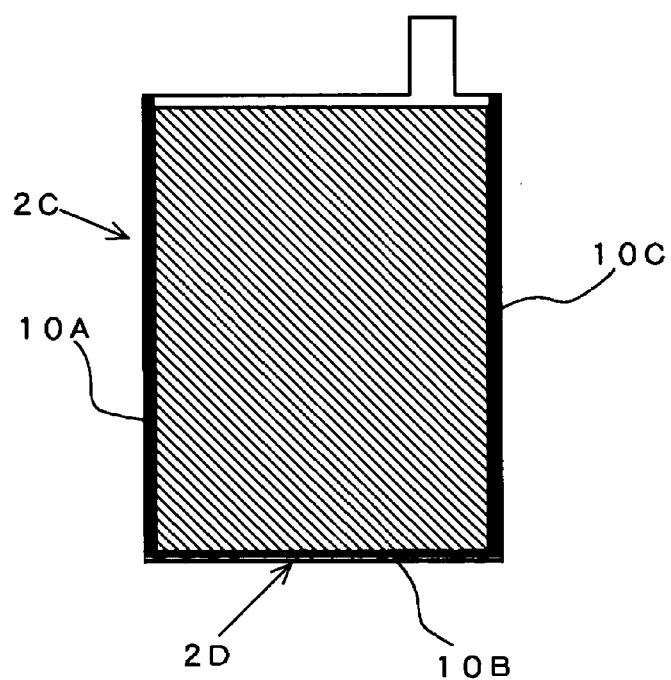
FIG. 4B is illustrative of the positive electrode in another embodiment of the invention.

FIG. 4A is illustrative in plan of the positive electrode in one embodiment of the invention, and FIG. 4B is illustrative in plan of the positive electrode in another embodiment of the invention.

As depicted in FIG. 4A, active substance-free portions 2C and 2D are formed on adjoining two sides of a collector of a positive electrode 2, and the active substance-free portions 2C and 2D are provided with insulating substance layers 10A and 10B, respectively.

With the positive electrode depicted in FIG. 4A, stacking can be carried out using the adjoining two sides with the insulating substance layers 10A and 10B formed on them as reference sides, so that precise positioning can be implemented. In other words, the active substance-free portions 2E and 2F not used for positioning may be cut off because of having no influence on positioning upon stacking, and battery performance.

FIG. 4B shows an embodiment wherein a common side and both sides adjacent to it are used as the adjoining two sides, and insulating substance layers 10A, 10B and 10C are formed on them.

In this embodiment, stacking may be implemented while positioning is carried out using three such sides as reference sides. For instance, when a flexible member is employed as a battery outer casing, a receiving site matching well with the width of the positive electrode collector is pre-embossed, and negative electrodes and positive electrodes with separators attached to them are alternately stacked in that receiving site. In this way, positioning is carried out by the wall surfaces of the receiving site, so that there can be obtained a multilayer secondary battery that can get around misalignment problems without recourse to fixation of the battery element.

In both embodiments of FIGS. 4A and 4B, too, separator width may be set equal to the width of the negative electrode and separator height may be higher than the height of the negative electrode exclusive of the electrode lead terminal. If this is done, it is then possible to make a multilayer secondary battery having a lot higher volume capacity density.

Figure 5:
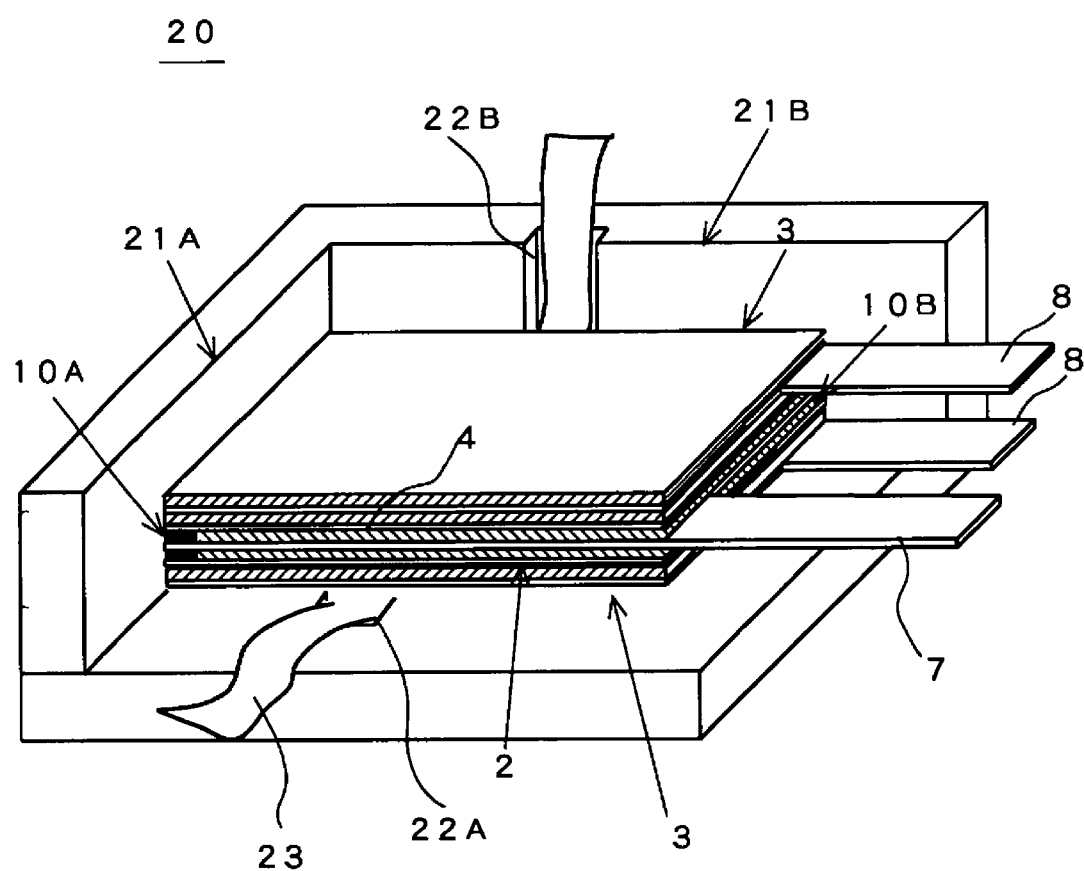
FIG. 5 is illustrative of one exemplary process of making the multilayer secondary battery according to the invention.
Figure 6:
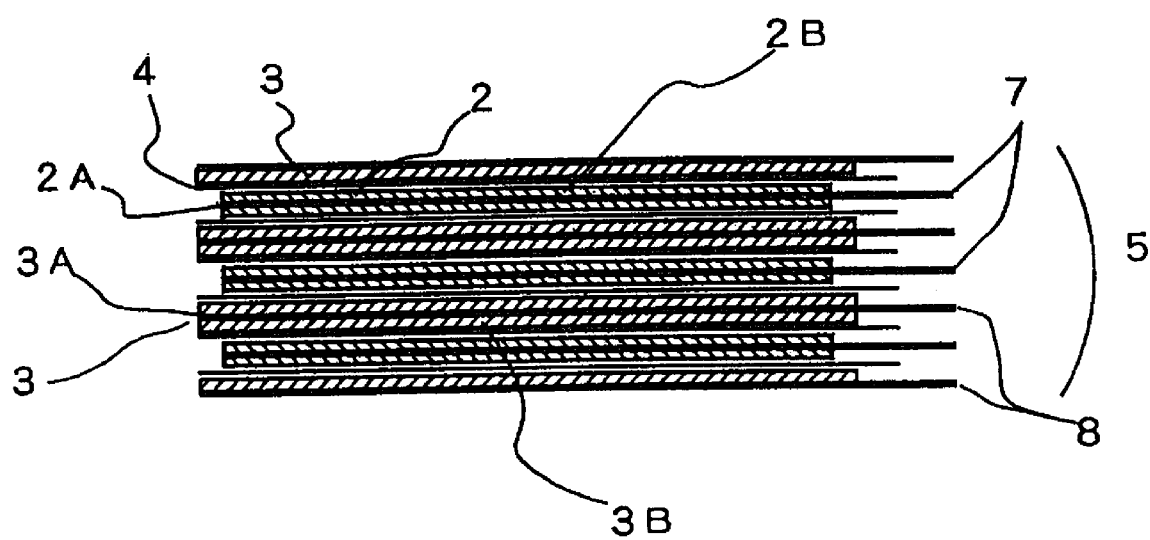
FIG. 6 is illustrative in section of a battery element in a prior art multilayer secondary battery, as sectioned in a vertical direction to electrode plane.
Figure 7A:
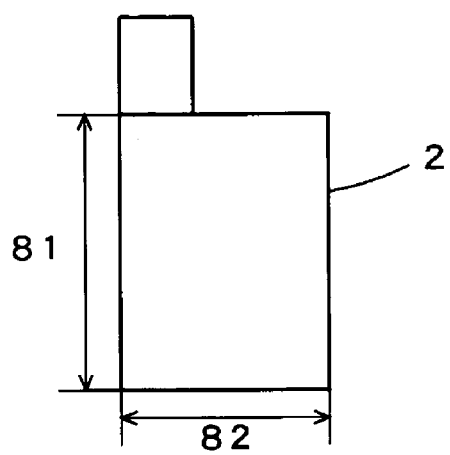
FIG. 7A is a plan view illustrative of a positive electrode.
Figure 7B:
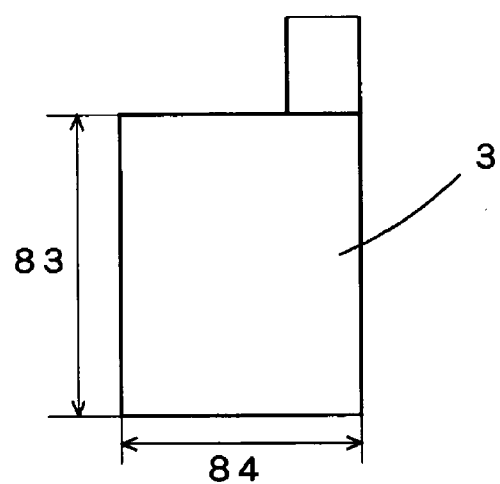
FIG. 7B is a plan view illustrative of a negative electrode.
Figure 7C:
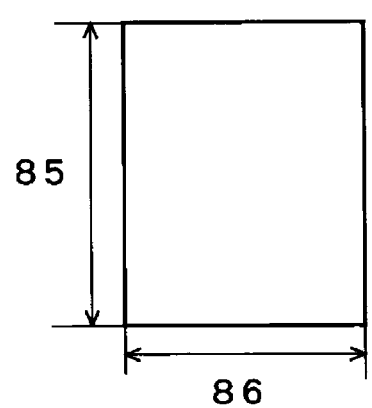
FIG. 7C is a plan view illustrative of a separator.

FIG. 5 is illustrative of one embodiment of the method of making the multilayer secondary battery according to the invention.

Setting the surfaces 21A and 21B of a battery assembling jig 20 as reference surfaces, a negative electrode 3 is placed with its end faces contiguous to both reference surfaces. Then, a separator 4 is bonded and fixed to insulating substance layers 10A and 10B coated on the positive electrode active substance-free portions of a positive electrode 2, and the end faces of the insulating substance layers 10A and 10B are thereafter positioned in such a way as to be contiguous to the reference surfaces 21A and 21B, respectively.

After a given number of the positive electrodes 2, each with the separator 4 bonded to it and a given number of negative electrodes are stacked together, a fixing tape 23 attached into fixing tape holes 22A and 22B is used to fix them with no misalignment.

Then, a battery element with the positive electrode lead terminals 7 and the negative electrode lead terminals 8 joined in place is received in an outer container, and an electrolyte is poured in it. In this way, a multilayer secondary battery can be manufactured.

An embodiment of the invention wherein the multilayer secondary battery according to the invention is a lithium ion battery is now explained.

A positive electrode has an aluminum foil of about 20 μm in thickness as a collector. This positive electrode could be fabricated by coating, drying, and rolling on the collector aluminum foil a slurry prepared from powders of lithium transition metal composite oxides such as lithium-cobalt composite oxides, lithium-manganese composite oxides, lithium-manganese-cobalt composite oxides and lithium-manganese-nickel composite oxides, a binder such as a polyvinylidene fluoride, an electrically conductive substance such as acetylene black, and so on, thereby forming a positive electrode active substance layer thereon.

When a battery element having negative electrodes with a separator located between them is prepared by stacking, it is required to prepare a positive electrode with positive electrode active substance layers formed on both sides of a collector. However, there is no negative electrode layers with a separator located between them, a positive electrode having an electrode active substance layer formed on only one side of the collector could be prepared.

A negative electrode has a copper foil of about 10 μm in thickness as a collector. This negative electrode could be fabricated by coating, drying, and rolling on the collector copper foil a slurry prepared from powders of a substance capable of electrochemically doping and de-doping lithium such as graphite and amorphous carbon, a binder such as polyvinylidene fluoride, and so on, thereby forming a negative electrode active substance layer thereon.

For the separator, porous films, unwoven fabrics, etc. of polyolefins such as polyethylene and polypropylene could be used.

For the electrolyte, non-aqueous ones wherein lithium salts are dissolved in non-aqueous solvents could be used. Specifically, mixtures of lithium salts such as $LiPF_6$ and $LiBF_4$ with ethylene carbonate, propylene carbonate, dimethyl carbonate, diethyl carbonate, methylethyl carbonate, 1,2-dimethoxyethane, methylpropylene carbonate, vinylene carbonate, γ-butyrolactone, methyl propionate and ethyl propionate could be used.

The positive electrode active substance-free portion to be formed on the positive electrode collector of the positive electrode according to the invention should preferably be provided with a width of 2 mm to 5 mm from the outer periphery of the positive electrode collector. At a width of less than 2 mm, it is difficult to provide stable joining or bonding of the positive electrode collector to the insulating substance coated on the surface of the positive electrode collector or the double-coated tape bonded over the surface of the collector. Furthermore, there is a problem that the insulating substance or the double-coated tape is bonded to as far as the surface of the positive electrode active substance layer, which may otherwise give rise to a portion on which the positive electrode active substance layer has no effective action and, hence, which has an adverse influence on the charge/discharge capacity of the battery.

As the width of the positive electrode active substance-free portion is larger than 5 mm, on the other hand, it poses a problem that the area of the positive electrode active substance layer, that is, the area of the positive electrode becomes substantially small, resulting in a decrease in the charge/discharge capacity of the battery.

For the insulating substance coated on the positive electrode active substance-free portion on the surface of the collector of the positive electrode, acrylic adhesives and polyester adhesives could be used if they are resistant to the non-aqueous electrolyte in the battery.

Joining could also be carried out using the thermosetting of thermosetting resins. In this case, a thermosetting resin is coated and dried on the bonding surface of the positive electrode active substance-free portion on the positive electrode collector, after which a separator is attached to a given position for heat fusing.

The thermosetting resin to be used should preferably have a setting temperature that is lower than the heat softening point of the separator.

When the adhesive or the thermosetting resin is used as the insulating active layer for the joining of the separator, it is preferable that it is coated on the electrode active substance-free portion on the collector of the positive electrode, and the separator is then placed at a given position for its joining.

Alternatively, when the insulating substance is coated on the electrode active substance-free portion, it is preferable that the thickness of the portion coated with the insulating substance does not exceed the thickness of the electrode active substance, because as that portion is higher than the electrode active substance, it causes an inter-electrode space to grow large.

When an insulating double-coated tape is used as the insulating substance, the double-coated tape could be joined to the electrode active substance-free portion on the collector of the positive electrode, and the separator could then be placed thereon for joining of both. Alternatively, the insulating double-coated tape could be joined to a given site of the separator, and then joined to the electrode active substance-free portion on the positive electrode for fixation of both.

Preferably, the thickness of the insulating double-coated tape should be such that the electrode active substance does not gain height.

Thus, if a given number of positive electrodes and a given number of negative electrodes are stacked together using a jig having reference points provided to the positive electrodes, fixed in such a way as not to cause misalignment, etc., and received in a battery outer casing, it is then possible to obtain a multilayer secondary battery with no misalignment.

Furthermore, when the size of the receiving site embossed in a flexible outer casing matches with the lateral width of the collectors of the positive electrodes, the lateral width of the negative electrodes and the lateral width of the separators, it is only needed to stack together a given number of positive electrodes with separators attached to them and a given number of negative electrodes in the receiving site and seal up that receiving site. It is thus possible to provide a multilayer secondary battery with no electrode misalignment and of improved reliability.

What is claimed is:

1. A multilayer secondary battery, comprising:
   a positive electrode including a positive electrode active substance layer formed on a flat, sheet-form positive electrode collector; and
   a negative electrode including a negative electrode active substance layer formed on a flat sheet-form negative electrode collector;
   a separator that separates the positive electrode and the negative electrode, the positive electrode, the negative electrode and the separator being stacked together with the positive electrode and the negative electrode on opposite sides of the separator, wherein
   the positive electrode active substance layer differs in area from the negative electrode active substance layer,
   active substance-free portions with no active substance layer coated on them are formed on at least adjoining two sides of an outer periphery of a collector of a smaller area electrode having a smaller active substance layer area, wherein the active substance-free portions of the collector are formed only on a side of the collector opposite to a side from which an electrode lead terminal extends and on a side of the collector adjacent to the side from which the electrode lead terminal extends,
   a surface of the collectors at the active substance-free portions is covered with an insulating substance layer, and
   an end face of the insulating substance layer that faces away from a side contiguous to an active substance layer and an end face of a larger area electrode having a larger active substance layer area are located and stacked together on the same plane that intersects vertically an electrode plane.

2. The multilayer secondary battery according to claim 1, wherein the end face of the insulating substance layer that faces away from a side contiguous to an active substance layer and the end face of a larger area electrode having a larger active substance layer area are located and stacked together on a plane flush with an end face of the separator.

3. The multilayer secondary battery according to claim 1, wherein the sides with the active substance-free portions formed are opposite to a side from which an electrode lead terminal extends.

4. The multilayer secondary battery according to claim 1, wherein the insulating substance layer is an adhesive or an adhesive double-coated tape.

5. The multilayer secondary battery according to claim 1, wherein the positive electrode active substance-free portion to be formed on the positive electrode collector of the positive electrode is provided with a width, of 2 mm to 5 mm from the outer periphery of the positive electrode collector.

6. The multilayer secondary battery according to claim 1, wherein the multilayer secondary battery is a lithium battery, and the smaller area electrode is a positive electrode and the larger area electrode is a negative electrode.

7. The multilayer secondary battery according to claim 2, wherein the multilayer secondary battery is a lithium battery and the smaller area electrode is a positive electrode and the larger area electrode is a negative electrode.

8. The multilayer secondary battery according to claim 1, wherein the active-substance-free portions covered with the insulating substance are formed on adjoining two sides of the collector.

9. The multilayer secondary battery according to claim 1, wherein the insulating substance layer is an adhesive double-coated tape.

* * * * *